US011904791B1

(12) United States Patent
Pexton

(10) Patent No.: US 11,904,791 B1
(45) Date of Patent: Feb. 20, 2024

(54) FABRIC MOLDED ROOF RAIL AIRBAG SHELL

(71) Applicant: Rivian IP Holdings, LLC, Plymouth, MI (US)

(72) Inventor: Jamison Pexton, Centerville, UT (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/090,719

(22) Filed: Dec. 29, 2022

(51) Int. Cl.
*B60R 21/213* (2011.01)
*B60R 21/215* (2011.01)

(52) U.S. Cl.
CPC .......... *B60R 21/213* (2013.01); *B60R 21/215* (2013.01)

(58) Field of Classification Search
CPC .................................................... B60R 21/213
See application file for complete search history.

(56) References Cited

U.S. PATENT DOCUMENTS

| | | | | |
|---|---|---|---|---|
| 6,152,482 A | * | 11/2000 | Patel | B60R 21/213 |
| | | | | 280/730.2 |
| 6,481,744 B2 | * | 11/2002 | Melia | B60R 21/201 |
| | | | | 280/730.2 |
| 6,585,287 B1 | * | 7/2003 | Spaulding | B60R 21/213 |
| | | | | 280/730.2 |
| 9,278,661 B2 | * | 3/2016 | Jovicevic | B60R 21/213 |
| 9,539,974 B2 | * | 1/2017 | Fukuda | B60R 21/232 |
| 11,554,742 B2 | * | 1/2023 | Ichimura | B60R 21/237 |
| 2002/0074778 A1 | * | 6/2002 | Melia | B60R 21/213 |
| | | | | 280/730.2 |
| 2003/0006590 A1 | * | 1/2003 | Aoki | B60R 21/04 |
| | | | | 280/730.2 |
| 2003/0122354 A1 | * | 7/2003 | Spaulding | B60R 21/213 |
| | | | | 280/730.2 |
| 2007/0241543 A1 | * | 10/2007 | Jang | B60R 21/213 |
| | | | | 280/730.2 |
| 2008/0122203 A1 | * | 5/2008 | Steinbach | B60N 3/026 |
| | | | | 280/728.2 |
| 2012/0267879 A1 | * | 10/2012 | Kim | B60R 21/213 |
| | | | | 280/730.2 |
| 2015/0115575 A1 | * | 4/2015 | Jovicevic | B60R 21/213 |
| | | | | 280/728.2 |

(Continued)

FOREIGN PATENT DOCUMENTS

| CN | 106553610 A | * | 4/2017 | ........... B60R 21/213 |
|---|---|---|---|---|
| DE | 10004483 C2 | * | 4/2003 | ......... B60R 13/0206 |

(Continued)

OTHER PUBLICATIONS

"Airbags," Autoliv, retrieved from https://www.autoliv.com/safety-solutions/airbags, retrieved on Jan. 9, 2023, 5 pages.

(Continued)

*Primary Examiner* — Nicole T Verley
(74) *Attorney, Agent, or Firm* — HALEY GUILIANO LLP

(57) ABSTRACT

Systems and methods are presented herein for an airbag shell. The airbag shell comprises a u-shaped channel formed of moldable fabric. The moldable fabric is configured to become malleable when exposed to temperatures exceeding a melting point of the moldable fabric. An external surface of the u-shaped channel is configured to interface with a roof rail. An inner surface of the u-shaped channel is configured to receive an airbag.

20 Claims, 5 Drawing Sheets

(56) References Cited

U.S. PATENT DOCUMENTS

Figure 2:
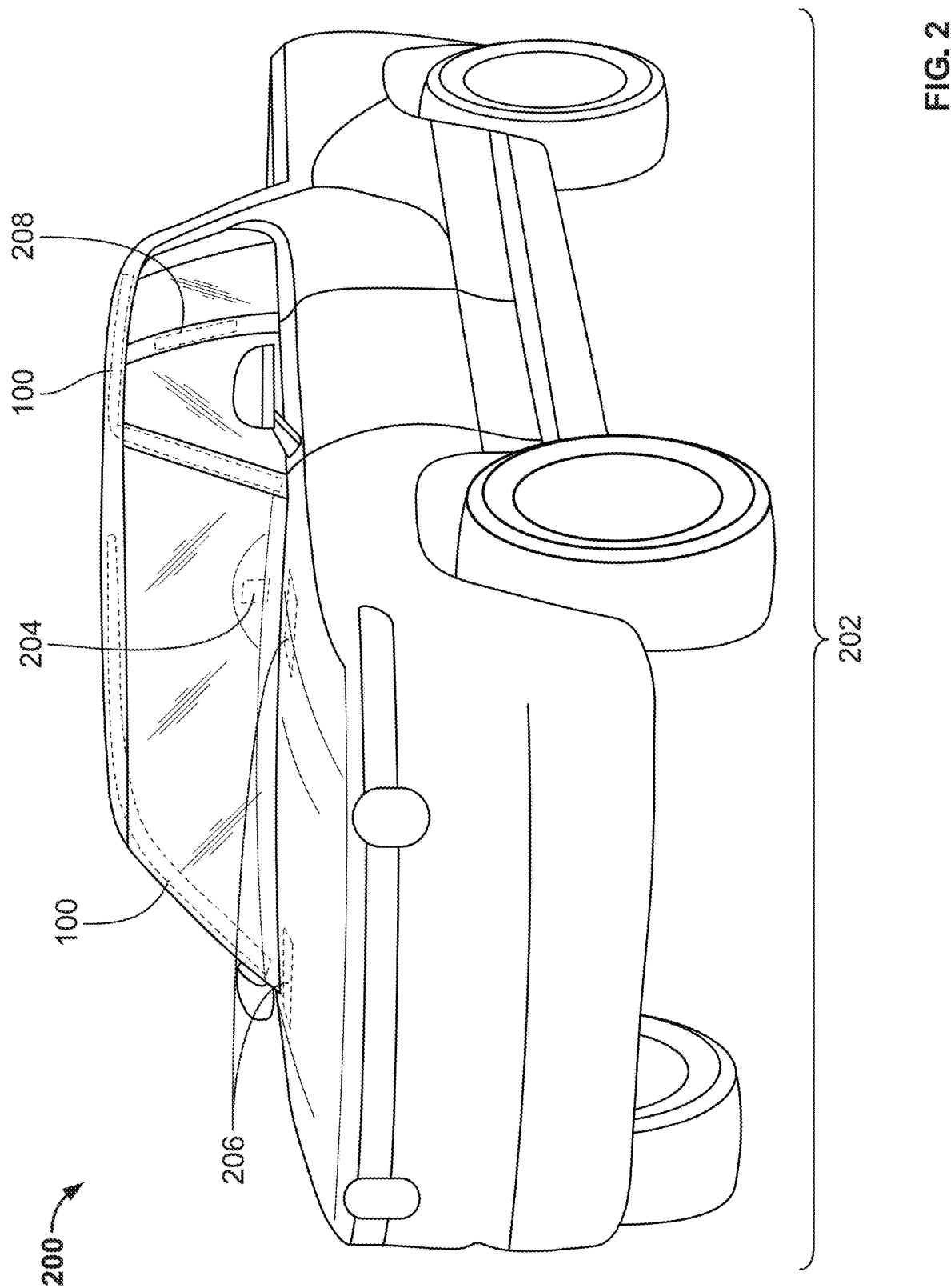

| | | | | |
|---|---|---|---|---|
| 2015/0239416 A1* | 8/2015 | Markusic | ............ | B60R 21/213 |
| | | | | 280/728.2 |
| 2018/0257599 A1* | 9/2018 | Sato | ............ | B60R 21/213 |
| 2019/0299907 A1* | 10/2019 | Jinnai | ............ | B60R 21/232 |

FOREIGN PATENT DOCUMENTS

| | | | | | |
|---|---|---|---|---|---|
| EP | 1842741 | A2 * | 10/2007 | ............ | B60R 21/213 |
| EP | 2666677 | B1 * | 6/2017 | ............ | B60R 21/213 |
| EP | 2957467 | B1 * | 3/2019 | ............ | B60R 21/213 |
| JP | 2004314706 | A * | 11/2004 | ............ | B60R 21/201 |
| JP | 2007106403 | A * | 4/2007 | ............ | B60R 21/213 |
| JP | 2011068276 | A * | 4/2011 | | |
| JP | 5411660 | B2 * | 2/2014 | | |
| JP | 5582751 | B2 * | 9/2014 | | |
| JP | 2014159277 | A * | 9/2014 | ............ | B60R 21/201 |
| WO | WO-2013146345 | A1 * | 10/2013 | ............ | B60R 21/213 |

OTHER PUBLICATIONS

"Autoliv Annual Report 2020," Autoliv, retrieved from https://www.autoliv.com/sites/default/files/pr/Autoliv_AR_2020_inkl_K10.pdf, Feb. 25, 2021, 70 pages.

Belgium, T., "Injection Moulded Passenger Airbag Housing From Quadrant CMS Saves Weight and Cost," retrieved from https://www.pressreleasefinder.com/Quadrant_CMS/QCMSPR005/en/, Jun. 6, 2007, 4 pages.

Butcher, L., "Additive manufacturing aids airbag housing development," Automotive Interiors World, retrieved from https://www.automotiveinteriorsworld.com/news/safety/additive-manufacturing-aids-airbag-housing-development.html, Jun. 16, 2020, 3 pages.

DN Staf, "Airbags: Materials make a difference," Design News, retrieved from https://www.designnews.com/materials-assembly/airbags-materials-make-difference, Oct. 6, 1997, pp. 17.

Needle Felt: The Next-Generation Material for Occupant Safety Systems, by ALT Technology, retrieved from https://alttechnologies.com/news-and-insights/needle-felt-airbag-covers/, Feb. 6, 2022, 7 Pages.

* cited by examiner

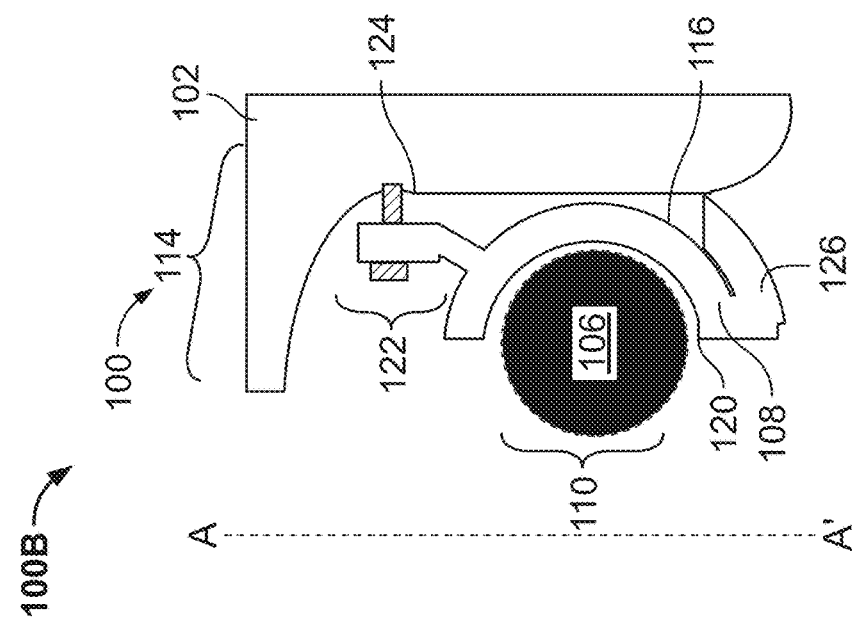
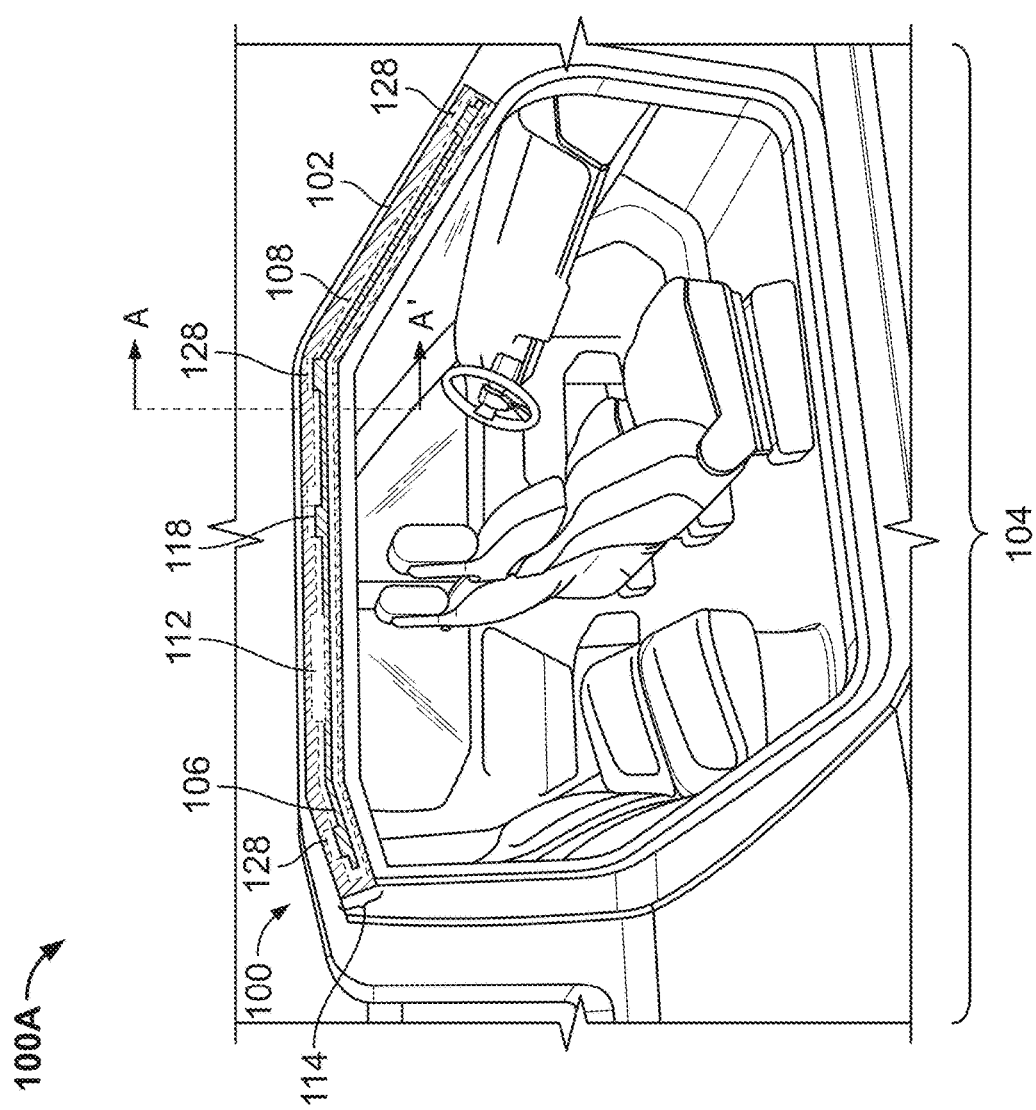
FIG. 1B
FIG. 1A

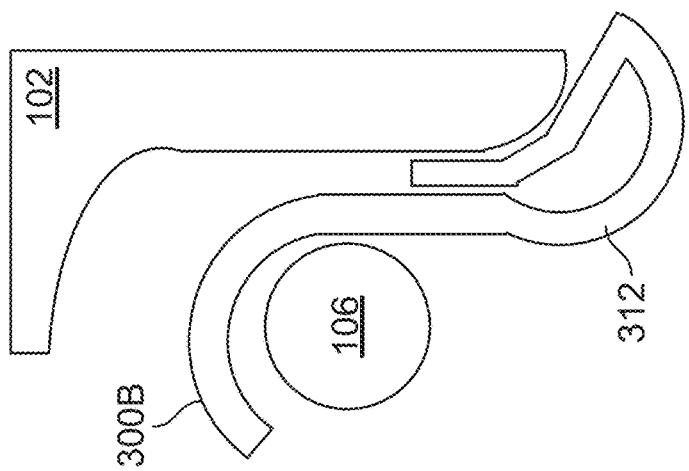
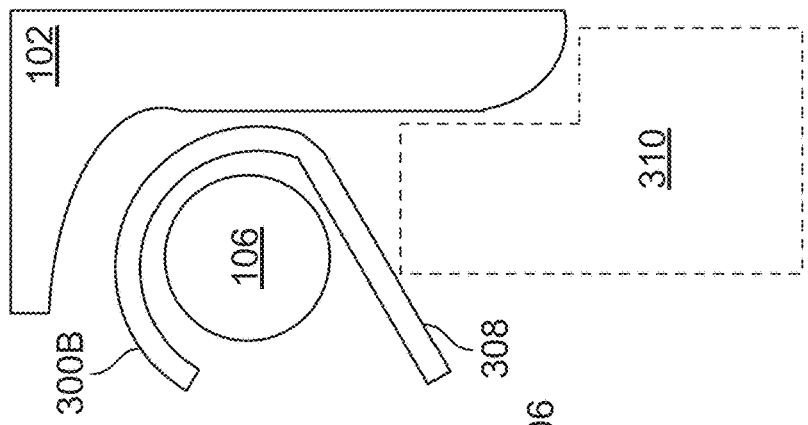
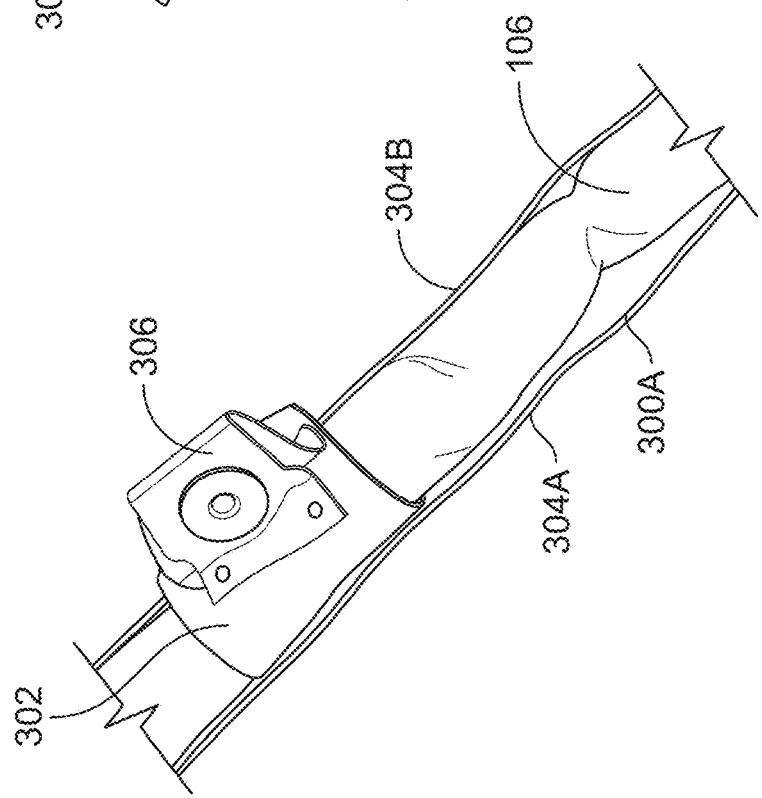

FABRIC MOLDED ROOF RAIL AIRBAG SHELL

INTRODUCTION

The present disclosure is directed to an airbag shell, and more particularly, to a roof rail airbag shell that protects the airbag and resists twisting

SUMMARY

The present disclosure is directed to a fabric molded roof rail airbag shell, and more particularly, to a roof rail airbag shell comprised of a moldable felt or fabric that runs a length of an airbag along a roof rail configured to accommodate the airbag and the shell. The airbag shell comprises a moldable fabric configured to become malleable when exposed to temperatures exceeding a temperature required to soften the surfaces of the moldable fabric such that the moldable fabric may be manipulated into a desired shape before cooling, settling, and hardening. At least one surface of the moldable fabric is configured to be abrasion resistant. Surfaces of roof rails configured to receive a roof rail airbag shell may have rough material profiles, which may include burrs that may cut or otherwise deform or damage an airbag arranged within the roof rails. Encasing the airbag in the moldable fabric prevents direct contact between the profile of the roof rail with the airbag, thereby improving deployment of the airbag as there is no rough surface interference of the airbag deployment. The moldable fabric is formed into a u-shaped channel configured to line the roof rail and also configured to receive an airbag. The u-shaped channel extends along the length of the roof rail and comprises a profile configured to prevent twisting of an airbag upon installation into the u-shaped channel. In some embodiments, edges of the u-shaped channel may be folded to increase stiffness of the walls of the u-shaped channel. In some embodiments, separate or independent portions of moldable fabric are affixed to the u-shaped channel to improve the stiffness of the u-shaped channel. For example, the u-shaped channel may comprise a ramp configured to extend over a vehicle trim that abuts an edge of the roof rail such that the ramp compresses the vehicle trim away from a deployment trajectory of the airbag, improving consistency of deployment of the airbag.

In some embodiments, the airbag shell comprises a u-shaped channel formed at least partially of moldable fabric. The moldable fabric is configured to become malleable when exposed to temperatures exceeding a melting point of the moldable fabric. As used herein, the melting point of a moldable fabric refers to the temperature at which an adhesive, or bonding material, used to maintain a mechanical connection between fibers of the fabric becomes less solid and more like a plasma or semi-liquid malleable composition. Once this melting point or temperature of malleability or formability is achieved, the moldable fabric softens and is able to be shaped such that when the temperature decreases, the moldable fabric resolidifies in the shape the fabric was formed into while it was malleable or formable in a plasma or semi-liquid state. In some examples, the melting point of the moldable fabric may be, for example, in the range of 210°-260° F. An external surface of the u-shaped channel is configured to interface with a roof rail. An inner surface of the u-shaped channel is configured to receive an airbag. In some embodiments, the roof rail comprises a metallic vehicle roof rail. In some embodiments, the external surface of the airbag shell is configured to be abrasion resistant.

In some embodiments, the u-shaped channel extends along the length of an opening in the roof rail. The u-shaped channel comprises at least one fold of the moldable fabric configured to reinforce at least a portion of the u-shaped channel. Extensions comprised of the moldable fabric are fixedly attached to the external surface of the u-shaped channel to reinforce a material stiffness of at least a portion of the u-shaped channel. The u-shaped channel comprises a profile that is configured to prevent twisting of an airbag apparatus arranged within the u-shaped channel.

In some embodiments, the disclosure is directed to an airbag assembly. The airbag assembly comprises an airbag and an airbag shell. The airbag shell comprises a moldable fabric formed into a u-shaped channel, and an external surface of the u-shaped channel configured to interface with an opening in a roof rail. In some embodiments, the airbag assembly comprises an inflation canister.

In some embodiments, the airbag comprises an elongated folded shape configured to extend along a length of the opening in the roof rail. A folded outer surface of the airbag is configured to interface with an inner surface of the u-shaped channel. The external surface of the u-shaped channel comprises at least one securing feature configured to interface with an inner surface of the roof rail.

In some embodiments, an external surface of the airbag comprises at least one securing feature configured to interface with an inner surface of the u-shaped channel. The u-shaped channel comprises at least one fold configured to reinforce at least a portion of the u-shaped channel. Extensions comprised of the moldable fabric are fixedly attached to the external surface of the u-shaped channel to reinforce a material stiffness of at least a portion of the u-shaped channel.

In some embodiments, the disclosure is directed to a vehicle assembly. The vehicle assembly comprises a vehicle frame comprised of a roof rail and an airbag assembly. The airbag assembly comprises an inflation canister, an airbag, and an airbag shell configured to be arranged within the roof rail, the airbag shell comprising a moldable fabric formed into a u-shaped channel configured to receive the airbag. A profile of the u-shaped channel is configured to prevent twisting of the airbag. The moldable fabric comprises an external surface configured to be abrasion resistant.

In some embodiments, the disclosure is directed to a method for mounting an airbag apparatus in a vehicle frame rail. A vehicle frame rail comprised of sheet metal is provided. The vehicle frame rail is configured to at least partially form a vehicle roof profile. The vehicle frame rail comprises an opening that extends a length of the vehicle frame rail. An airbag is provided. A moldable fabric is heated until the moldable fabric is malleable. The moldable fabric comprises at least one abrasion resistant surface. A u-shaped channel is formed out of the moldable fabric. The u-shaped channel is configured to receive the airbag at a surface opposite the at least one abrasion resistant surface. The airbag is inserted into the u-shaped channel. The u-shaped channel is inserted into the opening of the vehicle frame rail. The at least one abrasion resistant surface of the moldable fabric forming the u-shaped channel interfaces with an inner surface of the vehicle frame rail.

BRIEF DESCRIPTIONS OF THE DRAWINGS

Figure 4:
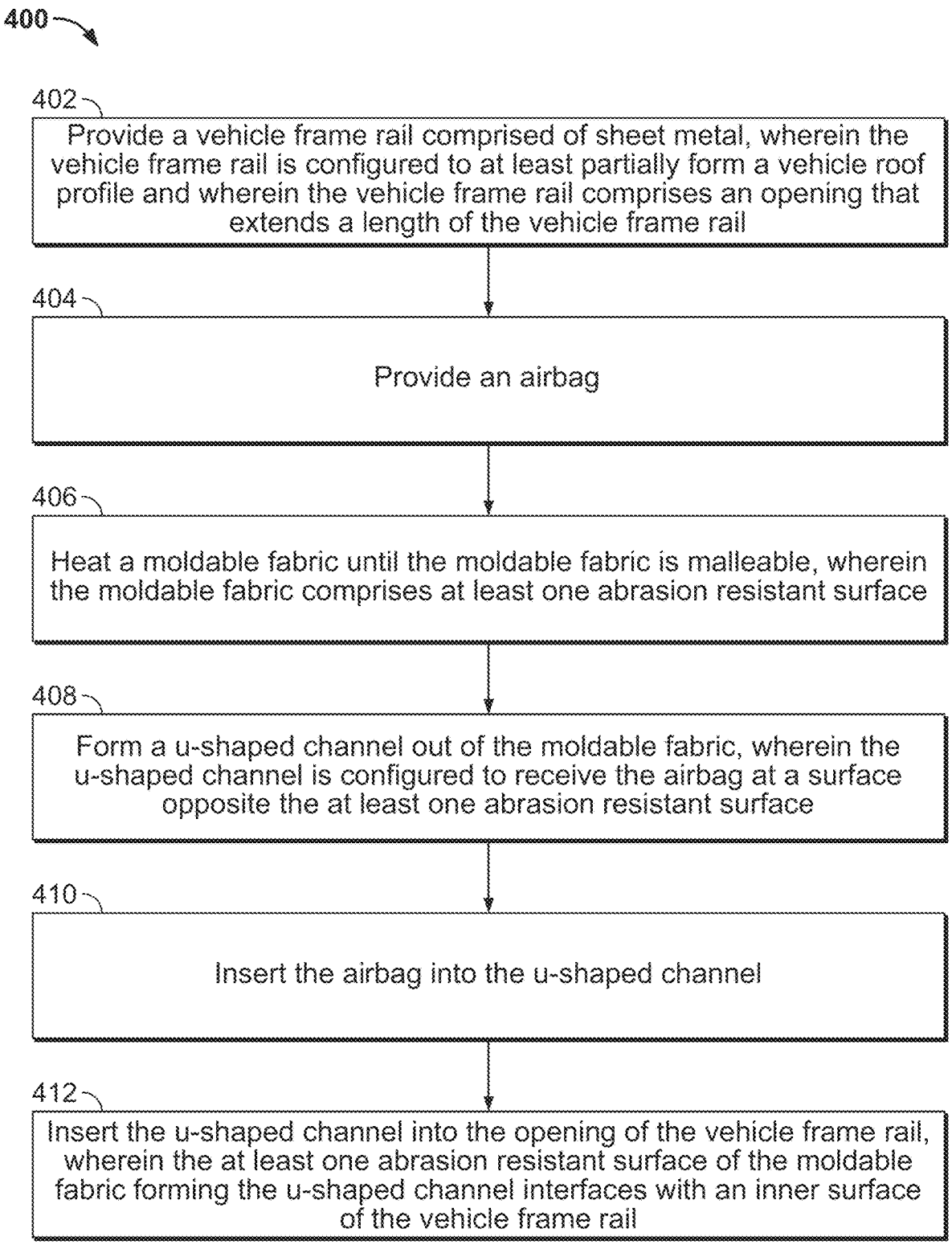
Figure 5:
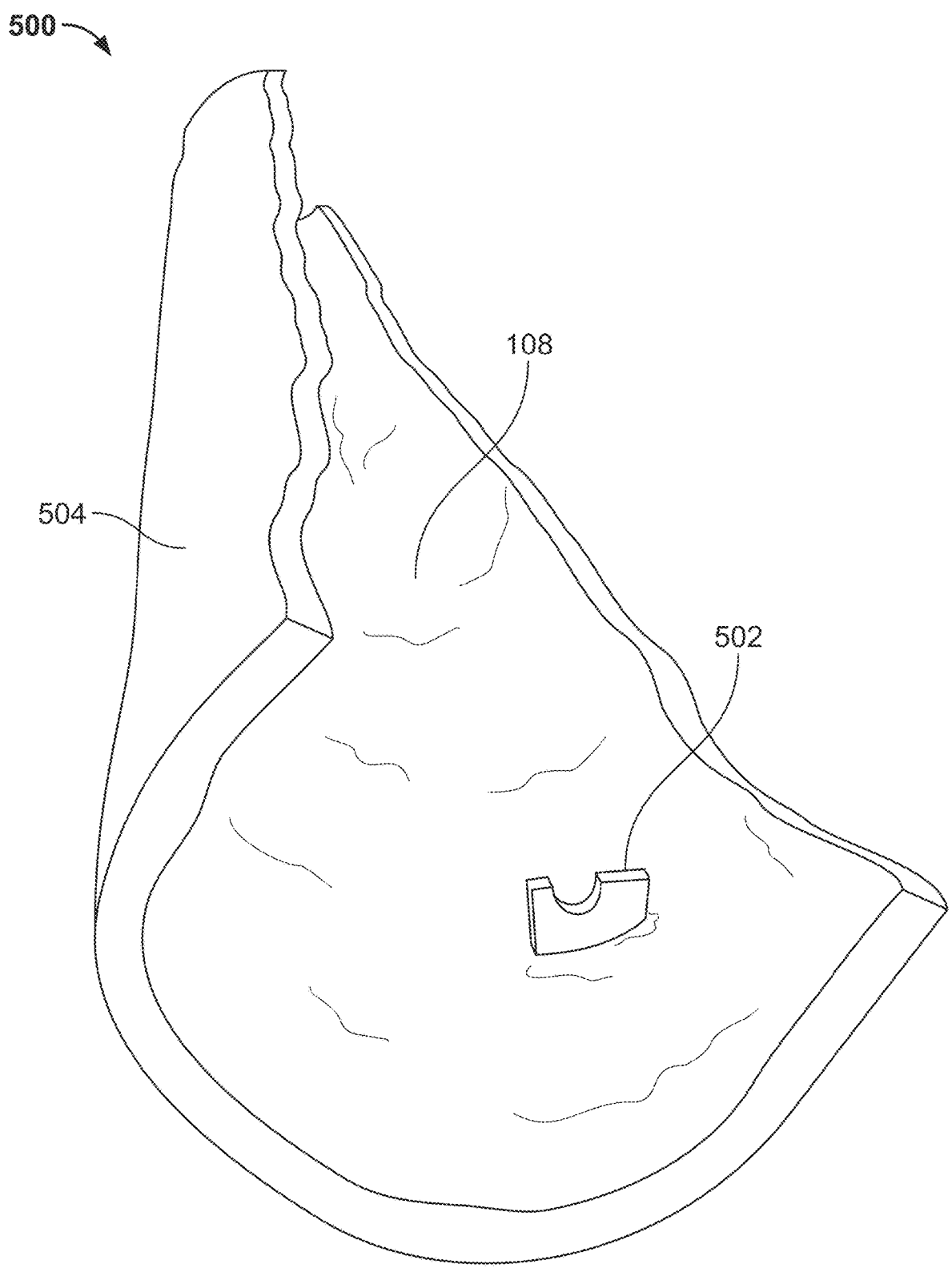

The above and other objects and advantages of the disclosure may be apparent upon consideration of the following detailed description, taken in conjunction with the accompanying drawings, in which:

FIGS. 1A and 1B each depict a respective view of an exemplary airbag assembly, in accordance with some embodiments of the disclosure;

FIG. 2 depicts an exemplary vehicle assembly with an airbag shell, in accordance with some embodiments of the disclosure;

FIGS. 3A, 3B, and 3C each depict an exemplary airbag assembly, in accordance with some embodiments of the disclosure;

FIG. 4 is a flow chart representing an illustrative process for mounting an airbag apparatus in a vehicle frame rail, in accordance with some embodiments of the disclosure; and FIG. 5 depicts an exemplary airbag shell, in accordance with some embodiments of the disclosure.

DETAILED DESCRIPTION

Methods and systems are provided herein for a roof rail airbag shell comprised of a moldable fabric.

FIGS. 1A and 1B each depict airbag assembly 100, in accordance with some embodiments of the disclosure. FIG. 1A shows side cutaway view 100A of an exemplary vehicle assembly comprised of airbag assembly 100. FIG. 1B shows cross sectional view 100B of airbag assembly 100 at a point along airbag assembly 100 marked by axis A-A'. Airbag assembly 100 may comprise more or fewer than the depicted features and elements.

Additionally, airbag assembly 100 may be incorporated, in whole or in part, into vehicle assembly 200 of FIG. 2. Airbag assembly 100 may also comprise assemblies shown in FIGS. 3 and 5. Airbag assembly 100 may be installed by the method shown and described in reference to FIG. 4.

Side view 100A depicts airbag assembly 100 arranged along roof rail 102. Roof rail 102 may be a metallic vehicle roof rail. Roof rail 102 at least partially forms vehicle body 104. Vehicle body 104 may be configured as a passenger compartment, a storage compartment, or a combination thereof. Airbag assembly 100 includes airbag 106, airbag shell 108 and inflation canister 112. Airbag 106 is depicted as extending along a length of opening 114 in roof rail 102. In some embodiments, airbag 106 is comprised of an elongated folded shape that extends along the length of opening 114. An elongated folded shape is advantageous to reduce a height profile of airbag 106 such that internal panels or cladding (e.g., interior fixtures and panels used to modify the styling of a vehicle passenger compartment) can be secured over airbag 106 without reducing the space within the vehicle compartment created by vehicle body 104. Airbag shell 108 is formed out of a moldable fabric. The moldable fabric is configured to become malleable (e.g., can be manipulated into a desired shape prior to cooling or hardening) when exposed to temperatures exceeding a melting point of the moldable fabric. Folded outer surface 118 of airbag 106 is configured to interface with inner surface 120 of u-shaped channel 110 of airbag shell 108. A profile of u-shaped channel 110 is configured to prevent twisting of airbag 106 when airbag 106 is deployed. Axis A-A' provides an approximate location for cross section view 100B, which depicts the cross sectional area of airbag assembly 100 at axis A-A'. Extensions 128 may be comprised of the moldable fabric used to form u-shaped channel 110. As shown, extensions 128 may extend in a direction perpendicular to corresponding portions of u-shaped channel 110 (e.g., toward an upper portion of the vehicle or away from opening 114 as shown). Extensions 128 are fixedly attached to, or incorporated into, external surface 116 of u-shaped channel 110 to reinforce a material stiffness of at least a portion of u-shaped channel 110 along the length of opening 114.

Cross section view 100B depicts a cross sectional area of airbag assembly 100. Airbag shell 108 includes u-shaped channel 110. External surface 116 of u-shaped channel 110 interfaces with opening 114 in roof rail 102. Inner surface 120 of u-shaped channel 110 is configured to receive airbag 106. External surface 116 of u-shaped channel 110 includes securing feature 122, which interfaces with inner surface 124 of roof rail 102. In some embodiments, securing feature 122 includes an extension from external surface 116 which is configured to receive a fastener, be secured by adhesive, or a combination thereof. In some embodiments, securing feature 122 comprises a securing extension configured to be directly coupled to a feature or a surface of external surface 116. External surface 116 is configured to be abrasion resistant to prevent damage to airbag 106 during installation into roof rail 102. In some examples, external surface 116 is configured to be abrasion resistant by comprising a material (e.g., a material different from the moldable fabric used to form the u-shaped channel 110) having a higher abrasive resistance, as described further with reference to FIG. 5. U-shaped channel 110 also includes fold 126, which is structured to reinforce external surface 116 by increasing material thickness and rigidity.

FIG. 2 depicts vehicle assembly 200 with a pair of airbag assemblies 100, in accordance with some embodiments of the disclosure. Vehicle assembly 200 may comprise more or fewer than the depicted features and elements. Additionally, vehicle assembly 200 may incorporate, in whole or in part, any or all of the features or elements shown in FIG. 1. Vehicle assembly 200 may also comprise assemblies shown in FIGS. 3 and 5. Vehicle assembly 200 may have each of airbag assemblies 100 installed by the method shown and described in reference to FIG. 4.

Vehicle assembly 200 includes vehicle frame 202. Vehicle frame 202 is inclusive of the features and elements of vehicle body 104 of FIG. 1. Arranged along each of a pair of roof rails in vehicle assembly 200 is a respective airbag assembly 100. Vehicle body 200 is also shown as including steering wheel airbag 204, dashboard airbags 206, and b-pillar airbag 208. Each of steering wheel airbag 204, dashboard airbags 206, and b-pillar airbag 208 may be housed, enclosed, or coupled to respective u-shaped channels formed out of a moldable fabric (e.g., the moldable fabric used to create u-shaped channel 110 of FIG. 1 may be molded into any suitable shaped depending on the shaped of the airbag, the shape of the part of vehicle body 200 where the airbag is to be installed, or a combination thereof).

FIGS. 3A, 3B, and 3C each depict airbag 106 arranged within a respective u-shaped channel, in accordance with some embodiments of the disclosure. FIG. 3A depicts u-shaped channel 300A. FIG. 3B depicts u-shaped channel 300B. FIG. 3C depicts u-shaped channel 300C. Each of u-shaped channels 300A, 300B, and 300C may comprise more or fewer than the depicted features and elements. Each of u-shaped channels 300A, 300B, and 300C include features that may be incorporated into a single u-shaped channel at the same or different cross sectional areas of the single u-shaped channel. For example, the features of u-shaped channel 300A may be useful for installation along a first portion of a roof rail and the features of u-shaped channel 300B may be useful for installation along a second portion of the roof rail. Additionally, each of u-shaped channels 300A, 300B, and 300C may be incorporated, in whole or in part, into vehicle assembly 200 of FIG. 2. Each of u-shaped channels 300A, 300B, and 300C may also include features and elements of the assembly shown in FIG. 5. Each of u-shaped channels 300A, 300B, and 300C may be installed by the method shown and described in reference to FIG. 4.

U-shaped channel 300A is shown as being molded into a shape that houses airbag 106. Reinforcement 302 is shown as connecting side 304A and side 304B of u-shaped channel 300A. Extending from reinforcement 302 is securing feature 306. Securing feature 306 corresponds to securing feature 122 of FIG. 1. As shown in FIG. 3A, securing feature 306 comprises an extension with a reinforced opening for receiving a fastener to secure u-shaped channel 300A to a roof rail (e.g., once arranged within opening 114 of roof rail 102 of FIG. 1).

U-shaped channel 300B is shown installed within roof rail 102. U-shaped channel 300B is configured to at least partially house or enclose airbag 106. Extending from an edge of u-shaped channel 200B is extension 308 which extends over a profile of vehicle body element 310. Vehicle body element 310 corresponds to a frame pillar, a vehicle interior panel, or a combination thereof. Extension 308 is configured to guide airbag 106 once deployed such that airbag 106 is not impeded or contacting vehicle body element 310. Extension 308 also functions to prevent twisting of the airbag during installation or deployment.

U-shaped channel 300C is shown installed along an opening of roof rail 102. U-shaped channel 300C is shown as at least partially enclosing or housing airbag 106. A portion of u-shaped channel 300C is folded upon itself to create reinforcement 312. Reinforcement 312 increases the thickness of u-shaped channel 300C to provide a more secure and stable support for airbag 106. Reinforcement 312 also prevents damage to airbag 106 during installation by providing extra layers of support along the length of u-shaped channel 300C and along the length to of airbag 106.

FIG. 4 is an illustrative flow chart of process 400 for mounting an airbag apparatus in a vehicle frame rail, in accordance with some embodiments of the disclosure. Process 400 may comprise more or fewer than the depicted features and elements. Additionally, process 400 may be used, in whole or in part, to manufacture the assemblies shown in FIGS. 1-3C and 5.

At 402, a vehicle frame rail comprised of sheet metal is provided, wherein the vehicle frame rail is configured to at least partially form a vehicle roof profile (e.g., as shown in FIG. 1A) and wherein the vehicle frame rail comprises an opening that extends a length of the vehicle frame rail. At 404, an airbag is provided (e.g., airbag 106 of FIGS. 1A and 1B, or any of the airbags of FIG. 2). At 406, a moldable fabric is heated until the moldable fabric is malleable, wherein the moldable fabric comprises at least one abrasion resistant surface. At 408, a u-shaped channel is formed out of the moldable fabric (e.g., u-shaped channel 108 of FIG. 1 or any of the u-shaped channels of FIGS. 3A-3C), wherein the u-shaped channel is configured to receive the airbag at a surface opposite the at least one abrasion resistant surface. At 410, the airbag is inserted into the u-shaped channel. At 412, the u-shaped channel is inserted into the opening of the vehicle frame rail (e.g., as shown in FIGS. 1 and 2), wherein the at least one abrasion resistant surface of the moldable fabric forming the u-shaped channel interfaces with an inner surface of the vehicle frame rail.

FIG. 5 depicts view 500 of airbag shell 108, in accordance with some embodiments of the disclosure. Airbag shell 108 may comprise more or fewer than the depicted features and elements. Additionally, airbag shell 108 may be incorporated, in whole or in part, into the assemblies of FIGS. 1A-3C. Airbag shell 108 may be formed at least in part by the method shown and described in reference to FIG. 4. Airbag shell 108 is comprised of first layer 502 with a surface configured to prevent damage to an airbag (e.g., airbag 106 of FIG. 1). In some examples, first layer 502 may comprise a material different from the moldable fabric, e.g., a material having a lower abrasion resistance. Airbag shell 108 is also comprised of second layer 504, which is comprised of an abrasion resistant material (e.g., at least one of nylon, carbon blends, aramid blends, silicone coated fabrics). The abrasion resistant material is configured to prevent penetration or wear caused by metallic extensions, features, or burrs of a vehicle rail (e.g., roof rail 102 of FIG. 1). One or both of first layer 502 and second layer 504 may comprise a canvas or woven fabric with rigid fibers or metallic fibers integrated into the material for stiffness. Additionally, one or more surfaces of first layer 502 and second layer 504 may comprise an adhesive or substrate layer configured to achieve a melting point before becoming malleable.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. An airbag shell comprising:
   a u-shaped channel comprising a woven moldable fabric, wherein:
   the woven moldable fabric is configured to become malleable when exposed to a melting temperature of the woven moldable fabric;
   an external surface of the u-shaped channel is configured to interface with a roof rail;
   an inner surface of the u-shaped channel is configured to receive an airbag; and
   the u-shaped channel retains its shape after deployment of the airbag.

2. The airbag shell of claim 1, wherein the roof rail comprises a metallic vehicle roof rail.

3. The airbag shell of claim 1, wherein the inner surface comprises a first material having a first abrasion resistance, and the external surface comprises a second material having a second higher abrasion resistance.

4. The airbag shell of claim 1, wherein the u-shaped channel extends along a length of an opening in the roof rail.

5. The airbag shell of claim 1, wherein the u-shaped channel comprises at least one fold of the woven moldable fabric configured to reinforce at least a portion of the u-shaped channel.

6. The airbag shell of claim 1, wherein extensions comprised of the woven moldable fabric are fixedly attached to the external surface of the u-shaped channel to reinforce a material stiffness of at least a portion of the u-shaped channel.

7. The airbag shell of claim 1, wherein the u-shaped channel comprises a profile that is configured to prevent twisting of an airbag apparatus arranged within the u-shaped channel.

8. An airbag assembly comprising:
   an airbag; and
   an airbag shell comprising:
      a woven moldable fabric comprising a u-shaped channel, wherein the u-shaped channel retains its shape after deployment of the airbag; and
      an external surface of the u-shaped channel configured to interface with an opening in a roof rail.

9. The airbag assembly of claim 8, further comprising an inflation canister.

10. The airbag assembly of claim 8, wherein the airbag comprises an elongated folded shape configured to extend along a length of the opening in the roof rail.

11. The airbag assembly of claim 8, wherein a folded outer surface of the airbag is configured to interface with an inner surface of the u-shaped channel.

12. The airbag assembly of claim 11, wherein the inner surface of the u-shaped channel comprises a second material different from the woven moldable fabric.

13. The airbag assembly of claim 8, wherein the external surface of the u-shaped channel comprises at least one securing feature configured to interface with an inner surface of the roof rail.

14. The airbag assembly of claim 8, wherein an external surface of the airbag comprises at least one securing feature configured to interface with an inner surface of the u-shaped channel.

15. The airbag assembly of claim 8, wherein the external surface of the u-shaped channel comprises a second material having a higher abrasion resistance than an abrasion resistance of the woven moldable fabric.

16. The airbag assembly of claim 8, wherein the u-shaped channel comprises at least one fold configured to reinforce at least a portion of the u-shaped channel.

17. The airbag assembly of claim 8, wherein extensions comprised of the woven moldable fabric are fixedly attached to the external surface of the u-shaped channel to reinforce a material stiffness of at least a portion of the u-shaped channel.

18. A vehicle assembly comprising:
   a vehicle frame comprised of a roof rail; and
   an airbag assembly comprising:
      an inflation canister;
      an airbag; and
      an airbag shell configured to be arranged within the roof rail, the airbag shell comprising a woven moldable fabric comprising a u-shaped channel configured to receive the airbag, wherein u-shaped channel retains its shape after deployment of the airbag.

19. The vehicle assembly of claim 18, wherein a profile of the u-shaped channel is configured to prevent twisting of the airbag.

20. The vehicle assembly of claim 18, wherein the woven moldable fabric comprises an external surface configured to be abrasion resistant.

\* \* \* \* \*